US009423850B2

(12) United States Patent
Christopher et al.

(10) Patent No.: US 9,423,850 B2
(45) Date of Patent: Aug. 23, 2016

(54) SYSTEM AND METHOD OF POWER CONTROL FOR EMBEDDED SYSTEMS WITHOUT ADVANCED CONFIGURATION AND POWER INTERFACE (ACPI)

(71) Applicant: AMERICAN MEGATRENDS, INC., Norcross, GA (US)

(72) Inventors: Samvinesh Christopher, Suwanee, GA (US); Varadachari Sudan Ayanam, Suwanee, GA (US); Yugender P. Subramanian, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 152 days.

(21) Appl. No.: 14/565,795

(22) Filed: Dec. 10, 2014

(65) Prior Publication Data
US 2016/0170464 A1    Jun. 16, 2016

(51) Int. Cl.
*G06F 1/32*   (2006.01)
*G06F 1/26*   (2006.01)

(52) U.S. Cl.
CPC .............. *G06F 1/3203* (2013.01); *G06F 1/263* (2013.01)

(58) Field of Classification Search
None
See application file for complete search history.

(56) References Cited

U.S. PATENT DOCUMENTS

| 6,219,742 B1 * | 4/2001 | Stanley | G06F 1/26 710/100 |
| 7,774,633 B1 * | 8/2010 | Harrenstien | G06F 1/24 713/300 |
| 2008/0168288 A1 * | 7/2008 | Jia | G06F 1/3203 713/323 |

* cited by examiner

*Primary Examiner* — Paul Yanchus, III
(74) *Attorney, Agent, or Firm* — Tim Tingkang Xia, Esq.; Locke Lord LLP (57) ABSTRACT

A system for power control includes a power supply having a power supply line and a standby power line, a logic circuit having a first output terminal connected to the power supply and three input terminals, a processing device connected to the standby power line and the power supply line, and a power switch. The processing device includes at least one processor, a storage storing a code executable by the processor, and four input/output (I/O) interfaces. A first, second and third I/O interfaces of the processing device are electrically connected to a first, second and third input terminals of the logic circuit, and a fourth I/O interface is connected to the third I/O interface. The power switch electrically connects or disconnects the standby power line to the first I/O interface and the first input terminal. The processing device has a power on state, a power off state, and a suspend state.

28 Claims, 5 Drawing Sheets

SYSTEM AND METHOD OF POWER CONTROL FOR EMBEDDED SYSTEMS WITHOUT ADVANCED CONFIGURATION AND POWER INTERFACE (ACPI)

FIELD

The present disclosure relates generally to a system and a method of power control, and particularly to a system and method of power control for embedded systems without Advanced Configuration and Power Interface (ACPI).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Power consumption is a major concern when designing electrical devices. Currently, the United States Environmental Protection Agency (EPA) launches the Energy Star program, which defines the specifications for power utilization of every type of device to get the "Energy Star" certification. The specification defines the max power usage for every state of the devices. Most markets do not accept devices without this certification.

Intel x86 based architecture based computing devices uses an ACPI standard for power control. This standard uses a combination of hardware, Basic Input/Output System (BIOS) and operating system to control the power usage, and has specification related to device configuration. However, certain embedded systems may not have the necessary hardware and BIOS for ACPI and uses specialized stripped down operation system, and a challenge exists in providing power control mechanisms on such embedded systems.

Therefore, an unaddressed need exists in the art to address the aforementioned deficiencies and inadequacies.

SUMMARY

In one aspect, the present disclosure relates to a system. The system includes at least one first service device. Each first service device has one or more processors, a service instant messaging (IM) application, and at least one first service. The service IM application, when executed at the one or more processors of the at least one first service device, is configured to:

In one aspect, the present disclosure relates to a system for power control. In certain embodiments, the system includes: a power supply, having a power supply line and a standby power line; a logic circuit having a first input terminal, a second input terminal, a third input terminal, and a first output terminal electrically connected to the power supply; a processing device electrically connected to the standby power line and the power supply line; and a power switch. The processing device includes: at least one processor; a storage storing a computer executable code executable by the at least one processor; a first input/output (I/O) interface electrically connected to the first input terminal; a second I/O interface electrically connected to the second input terminal; a third I/O interface electrically connected to the third input terminal; and a fourth I/O interface electrically connected to the third I/O interface. The power switch is configured to switchably electrically connect the standby power line to the first I/O interface and the first input terminal or to electrically disconnect the standby power line from the first I/O interface and the first input terminal. When the power switch electrically connects the standby power line to the first I/O interface and the first input terminal, the first I/O interface and the first input terminal respectively receives a high input value. When the power switch electrically disconnects the standby power line from the first I/O interface and the first input terminal, the first I/O interface and the first input terminal respectively receives a low input value. The logic circuit is configured to: in response to receiving the high input value from at least one of the first, the second and the third input terminal, drive a low output value to the power supply via the first output terminal; and in response to receiving the low input value from each of the first, the second and the third input terminal, drive a high output value to the power supply via the first output terminal. The power supply is configured to: provide power to the standby power line; in response to receiving the low output value from the logic circuit, provide power to the power supply line; and in response to receiving the high output value from the logic circuit, cut off power to the power supply line. The processing device is configured to: in response to receiving power from the power supply line, switch to a power on state, and execute the computer executable code at the processor. The computer executable code, when executed at the processor, is configured to: drive a high value as the high input value to the second I/O interface when the processing device is in the power on state; and in response to receiving the high input value from the first I/O interface, drive a low value as the low input value to the second I/O interface, and control the processing device to switch to a power off state.

In certain embodiments, the processing device further includes a resume module electrically connected to the standby power line and the fourth I/O interface. In certain embodiments, the processing device is further configured to: in response to receiving a suspend signal from the resume module, switch the processing device to a suspend state, and monitor status of the first I/O interface and the fourth I/O interface.

In certain embodiments, when the processing device in the suspend state receives the high input value from the first I/O interface, the processing device is configured to switch to the power on state.

In certain embodiments, the resume module is configured to: receive a wakeup signal from a peripheral device or a local area network (LAN); and in response to receiving the wakeup signal, drive the high input value to the third I/O interface. In certain embodiments, when the processing device in the suspend state receives the high input value from the fourth I/O interface, the processing device is configured to switch to the power on state.

In certain embodiments, when the processing device in the power on state receives the high input value from the first I/O interface for less than a first predetermined time, the processing device is configured to: safely shut down the code; drive the low input value to the second I/O interface; and switch to the power off state.

In certain embodiments, when the processing device in the power on state receives the high input value from the first I/O interface for greater than or equal to the first predetermined time, the processing device is configured to: drive the low input value to the second I/O interface; and switch to the power off state.

In certain embodiments, the first predetermined time is about 5 seconds.

In certain embodiments, the logic circuit includes: a first OR gate, having two input terminals respectively electrically connected to the first and second input terminals, and an output terminal; a second OR gate, having two input terminals respectively electrically connected to the third input terminal and the output terminal of the first OR gate, and an output terminal; and a NOT gate, having an input terminal connected to the output terminal of the second OR gate, and an output terminal connected to the first output terminal.

In certain embodiments, each of the first, second, third and fourth I/O interfaces is a general-purpose input/output (GPIO) interface. In certain embodiments, the first and fourth I/O interfaces are configured to be input GPIO interfaces, and the second and third I/O interfaces are configured to be output GPIO interfaces.

In certain embodiments, the storage is a flash memory.

Another aspect of the present disclosure relates to a method of performing power control in a system. In certain embodiments, the method includes:

providing, by a power supply of the system, power to a standby power line, wherein the standby power line is electrically connected to a processing device and a power switch of the system, wherein the processing device has at least one processor, a storage storing a computer executable code, a first I/O interface, a second I/O interface, a third I/O interface, and a fourth I/O interface, wherein the power switch is configured to connect the standby power line to the first I/O interface and a first input terminal of a logic circuit or to electrically disconnect the standby power line from the first I/O interface and the first input terminal, wherein the logic circuit has the first input terminal, a second input terminal, a third input terminal, and a first output terminal electrically connected to the power supply, and wherein the logic circuit is configured to:

in response to receiving the high input value from at least one of the first, the second and the third input terminal, drive a low output value to the power supply via the first output terminal; and in response to receiving the low input value from each of the first, the second and the third input terminal, drive a high output value to the power supply via the first output terminal;

in response to receiving the low output value from the logic circuit, providing, by the power supply, power to a power supply line, wherein the power supply line is electrically connected to the processing device;

in response to receiving power from the power supply line, switching, by the processing device, to a power on state, and executing the computer executable code at the processor;

when the processing device is in the power on state, driving, by the code executed at the processor, the high input value to the second I/O interface;

in response to receiving the high output value from the logic circuit, cutting off, by the power supply, power to the power supply line; and in response to receiving a high value from the first I/O interface, driving, by the code executed at the processor, the low input value to the second I/O interface, and controlling the processing device to switch to a power off state.

In certain embodiments, the method further includes: in response to receiving a suspend signal from a resume module of the processing device, switching, by the processing device, to a suspend state, and monitoring status of the first I/O interface and the fourth I/O interface, wherein the resume module is electrically connected to the standby power and the fourth I/O interface.

In certain embodiments, the method further includes: switching, by the processing device, to the power on state when the processing device in the suspend state receives the high input value from the first I/O interface.

In certain embodiments, the method further includes: receiving, at the resume module, a wakeup signal from a peripheral device or a local area network (LAN); in response to receiving the wakeup signal, driving, by the resume module, the high input value to the third input terminal of the logic circuit; and switching, by the processing device, to the power on state when the processing device in the suspend state receives the high input value from the fourth I/O interface.

In certain embodiments, when the processing device in the power on state receives the high input value from the first I/O interface for less than a first predetermined time, the processing device is configured to: safely shut down the code; drive the low input value to the second I/O interface; and switch to the power off state.

In certain embodiments, when the processing device in the power on state receives the high input value from the first I/O interface for greater than or equal to the first predetermined time, the processing device is configured to: drive the low input value to the second I/O interface; and switch to the power off state. In certain embodiments, the first predetermined time is about 5 seconds.

In certain embodiments, the logic circuit includes: a first OR gate, having two input terminals respectively electrically connected to the first and second input terminals, and an output terminal; a second OR gate, having two input terminals respectively electrically connected to the third input terminal and the output terminal of the first OR gate, and an output terminal; and a NOT gate, having an input terminal connected to the output terminal of the second OR gate, and an output terminal connected to the first output terminal.

In certain embodiments, each of the first, second, third and fourth I/O interfaces is a general-purpose input/output (GPIO) interface. In certain embodiments, the first and fourth I/O interfaces are configured to be input GPIO interfaces, and the second and third I/O interfaces are configured to be output GPIO interfaces.

A further aspect of the present disclosure relates to a non-transitory computer readable medium storing computer executable code. The code, when executed at a processor of a processing device of a system, is configured to: drive a high value as a high input value to a second input/output (I/O) interface of the processing device when the processing device is in a power on state, wherein the processing device is electrically connected to a standby power line and a power supply line of a power supply, wherein the processing device includes: the processor; a first I/O interface electrically connected to a first input terminal of a logic circuit of the system, wherein the logic circuit has the first input terminal, a second input terminal, a third input terminal, and a first output terminal electrically connected to the power supply; a second I/O interface electrically connected to the second input terminal; a third I/O interface electrically connected to the third input terminal; and a fourth I/O interface electrically connected to the third I/O interface; and in response to receiving the high input value from the first I/O interface, drive a low value as a low input value to the second I/O interface, and control the processing device to switch to a power off state. In certain embodiments, a power switch of the system is configured to switchably electrically connect the standby power line to the first I/O interface and the first input terminal or to electrically disconnect the standby power line from the first I/O interface and the first input terminal, wherein: when the power switch electrically connects the standby power line to the first I/O interface and the first input terminal, the first I/O interface and the first input terminal respectively receives the high input value; and when the power switch electrically disconnects the standby power line from the first I/O interface and the first input terminal, the first I/O interface and the first input terminal respectively receives the low input value. In certain embodiments, the logic circuit is configured to: in response to receiving the high input value from at least one of the first, the second and the third input terminal, drive a low output value to the power supply via the first output terminal; and in response to receiving the low input value from each of the first, the second and the third input terminal, drive a high output value to the power supply via the first output terminal. In certain embodiments, the power supply is configured to: provide power to the standby power line; in response to receiving the low output value from the logic circuit, provide power to the power supply line; and in response to receiving the high output value from the logic circuit, cut off power to the power supply line. In certain embodiments, the processing device is configured to: in response to receiving power from the power supply line, switch to the power on state, and execute the computer executable code at the processor.

In certain embodiments, the processing device further includes a resume module electrically connected to the standby power line and the fourth I/O interface. In certain embodiments, the processing device is further configured to: in response to receiving a suspend signal from the resume module, switch the processing device to a suspend state, and monitor status of the first I/O interface and the fourth I/O interface.

In certain embodiments, when the processing device in the suspend state receives the high input value from the first I/O interface, the processing device is configured to switch to the power on state.

In certain embodiments, the resume module is configured to: receive a wakeup signal from a peripheral device or a local area network (LAN); and in response to receiving the wakeup signal, drive the high input value to the third I/O interface. In certain embodiments, when the processing device in the suspend state receives the high input value from the fourth I/O interface, the processing device is configured to switch to the power on state.

In certain embodiments, when the processing device in the power on state receives the high input value from the first I/O interface for less than a first predetermined time, the processing device is configured to: safely shut down the code; drive the low input value to the second I/O interface; and switch the processing device to the power off state.

In certain embodiments, when the processing device in the power on state receives the high input value from the first I/O interface for greater than or equal to the first predetermined time, the processing device is configured to: drive the low input value to the second I/O interface; and switch the processing device to the power off state. In certain embodiments, the first predetermined time is about 5 seconds.

In certain embodiments, the logic circuit includes: a first OR gate, having two input terminals respectively electrically connected to the first and second input terminals, and an output terminal; a second OR gate, having two input terminals respectively electrically connected to the third input terminal and the output terminal of the first OR gate, and an output terminal; and a NOT gate, having an input terminal connected to the output terminal of the second OR gate, and an output terminal connected to the first output terminal.

In certain embodiments, each of the first, second, third and fourth I/O interfaces is a general-purpose input/output (GPIO) interface. In certain embodiments, the first and fourth I/O interfaces are configured to be input GPIO interfaces, and the second and third I/O interfaces are configured to be output GPIO interfaces.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other input/output (I/O) devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

An embedded system is a computer system with a dedicated function within a larger mechanical or electrical system, often with real-time computing constraints. It is embedded as part of a complete device often including hardware and mechanical parts. Embedded systems control many devices in common use today. Embedded systems are commonly found in consumer, cooking, industrial, automotive, medical, commercial and military applications, for example, telephone switches, cell/mobile phones, routers, network bridges, personal digital assistants (PDAs), mp3 players, videogame consoles, digital cameras, DVD players, GPS receivers, printers, microwave ovens, washing machines and dishwashers, thermostats, home automation for controlling lights, climate, security, audio/visual, surveillance, etc., anti-lock braking system (ABS), Electronic Stability Control (ESC/ESP), traction control (TCS), motes, and the like.

As discussed above, an embedded system may be without ACPI support. Implementing ACPI on such an embedded system without ACPI is an expensive and unnecessary effort, especially when the embedded system does not have the necessary hardware and BIOS, and uses specialized stripped down operation system. Further, most of the embedded systems may use SoC (System on Chip) or a fixed set of devices and do not need elaborate device configuration. Nevertheless, embedded devices do have to control power usage to get the Energy Star certification. The Energy Star specification defines the power consumption for the different states of the devices, including without being limited to a power off state (also referred to as an OFF state), a power on state (also referred to as a working state), and a suspend state, where the device is in a low power standby mode.

Figure 1:
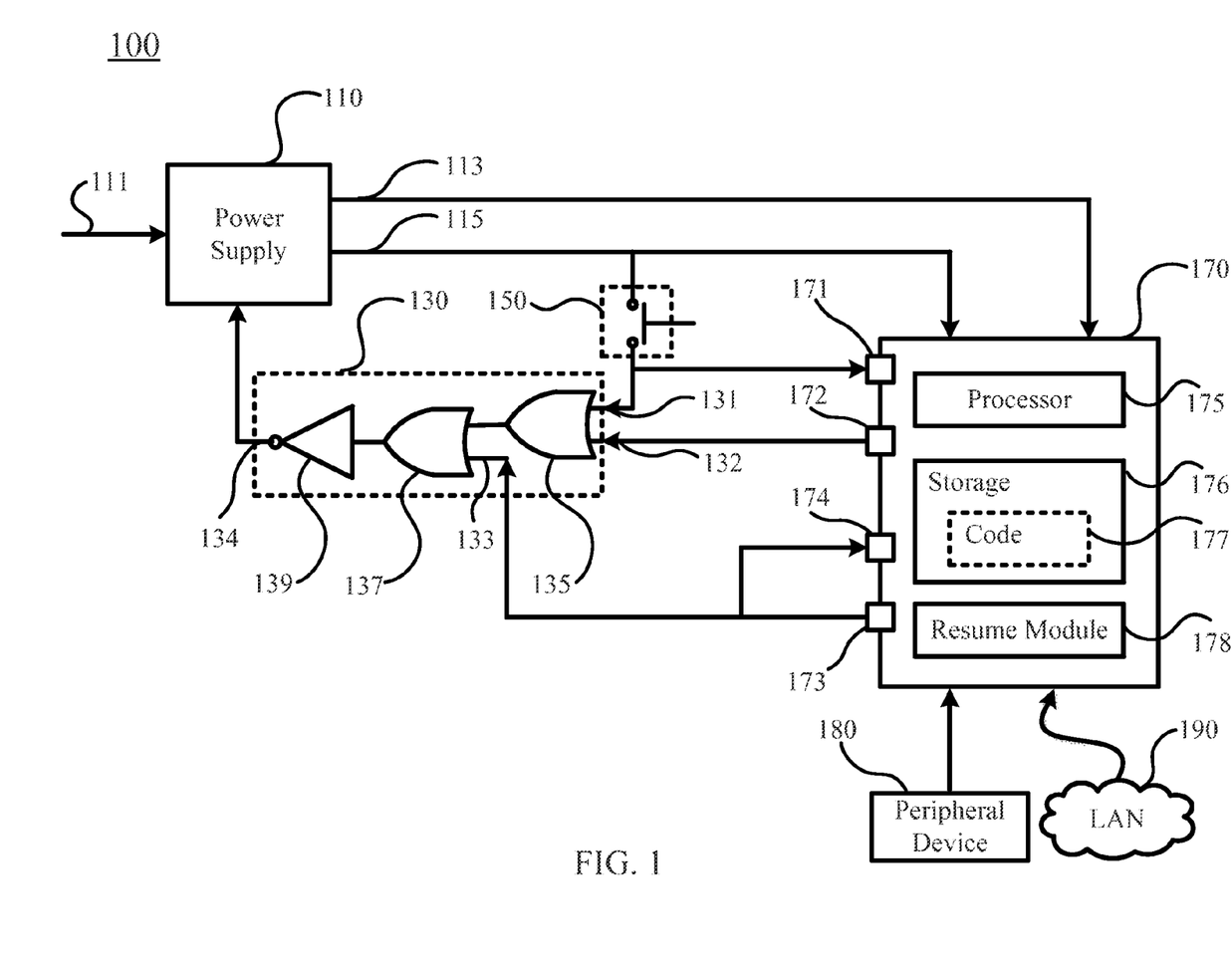
FIG. 1 schematically depicts a system of power control according to certain embodiments of the present disclosure.

In one aspect, the present disclosure is related to a system of low cost power control for embedded systems without ACPI. FIG. 1 schematically depicts a system of power control according to certain embodiments of the present disclosure. In certain embodiments, the system 100 may function as an independent computing device or a system on chip (SoC). In certain embodiments, the system 100 may function as a computing device or a subsystem being connected to a network in a virtual desktop infrastructure (VDI) system.

As shown in FIG. 1, the system 100 includes a power supply 110, a logic circuit 130, a power switch 150, a processing device 170, and optionally one or more peripheral devices 180 and a local area network (LAN) 190. It should be particularly noted that the system 100 may be a non-ACPI based system. In other words, the system 100 does not have ACPI based hardware, BIOS and operating systems.

As shown in FIG. 1, the power supply 110 has a power input line 111, a power supply line 113 and a standby power line 115. The power supply 110 is also connected to a first output terminal 134 of the logic circuit 130. In operation, the power supply 110 may be connected to a power source (not shown) through the power input line 111 such that the power supply 110 receives input power from the power input line 111. The power supply 110 also receives a signal from the first output terminal 134 of the logic circuit 130. Based on the signal received from the logic circuit 130, the power input line 111 provides power to the processing device 170 and the power switch 150 through the power supply line 113 and the standby power line 115. In certain embodiments, the power supply 110 may be any power supply, such as Advanced Technology eXtended (ATX) power supply or a power supply functions similar to the ATX. In certain embodiments, the input power from the power input line 111 may be an alternating current (AC) power input, and the output of the power from the power supply line 113 and the standby power 115 may be direct current (DC) power. The AC input may be 110 volt (V), 120 V, 220 V, 230 V or any other predetermined values. The DC output may be 3 V, 5 V, 12 V or any other predetermined values. The DC output from the power supply line 113 and the standby power line 115 may have the same voltage or different voltages.

The logic circuit 130 is a logic circuit which includes three input terminals and one output terminal. As shown in FIG. 1, the logic circuit 130 includes a first input terminal 131, a second input terminal 132, a third input terminal 133, and the first output terminal 134 electrically connected to the power supply 110. In certain embodiments, when at least one of the first input terminal 131, the second input terminal 132, and the third input terminal 133 receives a high input value (i.e., a logical "1" signal), the logic circuit 130 outputs a low output value (i.e., a logical "0" signal) to the power supply 110 through the first output terminal 134. When each of the first input terminal 131, the second input terminal 132, and the third input terminal 133 receives a low input value (i.e., the logical "0" signal), the logic circuit 130 outputs a high output value (i.e., the logical "1" signal) to the power supply 110 through the first output terminal 134. Alternatively, in certain embodiments, the logic circuit 130 may also be configured to output the high output value to the power supply 110 in response to receiving the high input value from at least one of the first, second and third input terminals 131, 132, and 133, and to output the low output value to the power supply 110 in response to receiving the low input value from each of the first, second and third input terminals 131, 132, and 133.

In certain embodiments, the logic circuit 130 may include a first OR gate 135, a second OR gate 137, and a NOT gate 139. The first OR gate 135 has two input terminals and one output terminal. The two input terminals of the first OR gate 135 may be electrically connected to the first input terminal 131 and the second input terminal 132 respectively. In other words, the two input terminals of the first OR gate 135 are essentially the first input terminal 131 and the second input terminal 132. The second OR gate 137 has two input terminals and one output terminal. The two input terminals of the second OR gate 137 may be electrically connected to the output terminal of the first OR gate 135 and electrically connected to the third input terminal 133 respectively. In other words, the two input terminals of the second OR gate 137 are essentially the output terminal of the first OR gate 135 and the third input terminal 133. The NOT gate 139 has one input terminal and one output terminal. The input terminal of the NOT gate 139 may be electrically connected to the output terminal of the second OR gate 137. The output terminal of the NOT gate 139 may be electrically connected to the first output terminal 134. In other words, the output terminal of the NOT gate 139 is essentially the first output terminal 134 of the logical circuit 130.

The first output terminal 134 is electrically connected to the power supply 110, such that the power supply 110 maintains or changes its power status based on the signal received from the first output terminal 134 of the logic circuit 130. In other words, the output signal of the logical circuit 130 controls the power supply 110. For example, when the power supply 110 is connected to a power source through the power input 111, the power supply 110 provides power to the standby power line 115. However, the power supply 110 may or may not provide power to the power supply line 113. In certain embodiments, when the power supply 110 receives the low output value (i.e., the logical "0" signal) from the first output terminal 134 of the logic circuit 130, the power supply 110 starts to provide power to the power supply line 113, and both the power supply line 113 and the standby power line 115 are powered up. In this case, the processing device 170 may receive power from the power supply line 113 to switch to a power on state. If the power supply 110 keeps receiving the low output value from the first output terminal 134 of the logic circuit 110, the power supply 110 maintains supplying power to the power supply line 113 and the standby power line 115, such that the processing device 170 may be maintained in the power on state. On the other hand, when the power supply 110 receives the high output value (i.e., the logical "1" signal) from the first output terminal 134 of the logic circuit 130, the power supply 110 is configured to power down the power supply line 113. In this case, the processing device 170 may switch to a power off state or a suspend state because the processing device 170 stops receiving power from the power supply line 113.

The power switch 150 is a switch for the user to control the power status of the processing device 170. In certain embodiments, the power switch 150 may be a switch of any type, such as a mechanical switch, an electronic switch, a biased switch, a toggle switch, or any other types of switches. For illustration purposes, the power switch 150 as shown in FIG. 1 is a push button switch. The connecting or disconnecting status of the push button switch may be changed by pressing the push button. For example, a user may switch the status of the power switch 150 between two different status by pressing the push button of the power switch 150. In certain embodiments, the status of the power switch 150 may include an "OFF" status and an "ON" status.

As shown in FIG. 1, the power switch 150 is configured to electrically connect the standby power line 115 to the first input terminal 131 of the logic circuit 130 and the first I/O interface 171 of the processing device 170, or to disconnect the standby power line 115 from the first input terminal 131 of the logic circuit 130 and the first I/O interface 171 of the processing device 170. When the power switch 150 is switched to an "ON" status (i.e., the power switch 150 is pressed), the power switch 150 electrically connects the standby power line 113 to the first I/O interface 171 and the first input terminal 131. Since the standby power line 113 receives power from the power supply 110, the first I/O interface 171 and the first input terminal 131 will respectively receive the high input value (i.e., the logical "1" signal) from the power switch 150. On the other hand, when the power switch 150 is switched to an "OFF" status (i.e., the power switch 150 is pressed again to be released), the power switch 150 electrically disconnects the standby power line 113 from the first I/O interface 171 and the first input terminal 131. In this case, the power from the standby power line 113 does not reach the first I/O interface 171 and the first input terminal 131. Thus, the first I/O interface 171 and the first input terminal 131 will stop receiving the high input value (i.e., the logical "1" signal) from the power switch 150. In other words, the first I/O interface 171 and the first input terminal 131 essentially receive the low input value (i.e., the logical "0" signal) from the power switch 150.

The processing device 170 controls the operation of the system 100. In certain embodiments, the processing device 170 may be a system on chip (SoC). As shown in FIG. 1, the processing device 170 has a plurality of I/O interfaces 171-174, at least one processor 175, a storage 176, and a resume module 178. In certain embodiments, the processing device 170 may include other necessary hardware components enabling the processing device 170 to operate, such as one or more memory modules (not shown), buses, and peripheral devices 180.

The processor 175 is configured to control operation of the processing device 170. The processor 175 may execute a stripped operation system or other applications stored in the storage 176. In certain embodiments, the processor 175 may be a central processing unit (CPU). In certain embodiments, the processing device 170 may run on more than one processor, such as two processors, four processors, eight processors, or any suitable number of processors.

The storage 176 may be a non-volatile data storage media for storing a computer executable code 177, which is executable at the processor 175. In certain embodiments, the code 177 may include, without being limited to, the stripped operating system (OS) (not shown) or other applications of the processing device 170.

In certain embodiments, the processing device 170 may further include a volatile memory, such as the random-access memory (RAM), for storing the data and information during the operation of the processing device 170.

The resume module 178 is a module to control the processing device 170 to switch between the power on state and the suspend state, or to switch between the power off state to the power on state. In certain embodiments, the resume module 178 may be independently operable from the processing device 170. In this case, the resume module 178 may be operated using the standby power provided by the standby power line 115. Thus, the resume module 178 is in operation even if the processor 175 is off or in the suspend state (i.e., the low power state). In certain embodiments, the resume module 178 may be implemented by hardware, software/firmware, or a combination thereof.

The I/O interfaces 171-174 of the processing device 170 may be hardware interfaces for receiving input signals to the processing device 170 and/or transmitting output signals towards the logical circuit 130. In certain embodiments, each of the I/O interfaces 171-174 may be a general purpose input/output (GPIO) interface. As shown in FIG. 1, the I/O interfaces 171-174 of the processing device 170 include a first I/O interface 171, a second I/O interface 172, a third I/O interface 173, and a fourth I/O interface 174. In one embodiment, the first and fourth I/O interfaces 171 and 174 are configured as input GPIO interfaces, and the second and third I/O interfaces 172 and 173 are configured as output GPIO interfaces.

As shown in FIG. 1, the first I/O interface 171 is electrically connected to the power switch 150 to function as a "switch status" interface. In other words, the processing device 170 is configured to receive a signal from the first I/O interface 171 based on the connectivity status of the power switch 150. For example, when the power switch 150 electrically connects the standby power line 115 to the first I/O interface 171, the processing device 170 receives the high input value (i.e., the logical "1" signal) from the first I/O interface 171. When the power switch 150 electrically disconnects the standby power line 115 from the first I/O interface 171, the processing device 170 receives the low input value (i.e., the logical "0" signal) from the first I/O interface 171. Further, as shown in FIG. 1, the first I/O interface 171 is electrically connected to the first input terminal 131 of the logic circuit 130. Thus, the signal received by the first I/O interface 171 and the first input terminal 131 will be the same. In other words, when the processing device 170 receives the high input value (i.e., the logical "1" signal) from the first I/O interface 171, the logic circuit 130 will receive the high input value through the first input terminal 131. Alternatively, when the processing device 170 receives the low input value (i.e., the logical "0" signal) from the first I/O interface 171, the logic circuit 130 will receive the low input value through the first input terminal 131.

The second I/O interface 172 is electrically connected to the second input terminal 132 of the logic circuit 110 to function as a "power up" interface. In other words, the processing device 170 is configured to drive a signal, which may be in a high value or a low value, through the second I/O interface 172 to the logic circuit 130 to control the power provided by the power supply line 113. For example, when the processing device 170 starts receiving power from the power supply line 113, the processing device 170 is configured to switch to the power on state, and execute the computer executable code 177 stored in the storage 176 at the processor 176. Once the code 177 is executed, the executed code 177 is configured to drive a high value as the high input value (i.e., the logical "1" signal) to the second I/O interface 172 such that the processing device 170 may be maintained in the power on state. Alternatively, when the processing device 170 receives a suspend signal or a power off signal, the executed code 177 is configured to drive a low value as the low input value (i.e., the logical "0" signal) to the second I/O interface 172 such that the processing device 170 may switch to the power off state or the suspend state.

The third I/O interface 173 is electrically connected to the third input terminal 133 of the logic circuit 130 to function as a "resume" interface, and the fourth I/O interface 174 is electrically connected to the third I/O interface 173 to function as a "resume status" interface. When the resume module 178 is activated, the resume module 178 drives a high value as the high input value (i.e., the logical "1" signal) to the third I/O interface 173. Since the third I/O interface 173 is electrically connected to the third input terminal 133 of the logic circuit 130 and to the fourth I/O interface 174, the fourth I/O interface 174 is configured to provide the high input value to the processing device 170, such that the processing device 170 is notified the active status of the resume module 178. On the other hand, when the resume module 178 is not activated, the resume module 178 essentially drives a low value as the low input value (i.e., the logical "0" signal) to the third I/O interface 173, and the processing device 170 in turn receives the low input value through the fourth I/O interface 174, such that the processing device 170 is notified the inactive status of the resume module 178.

In certain embodiments, as shown in FIG. 1, the system 100 may further include the peripheral devices 180 connected to the processing device 170. Examples of the peripheral devices may include, without being limited to, I/O devices such as keyboards, mouses, touching pads or any other I/O peripheral devices. In certain embodiments, one or more of the peripheral devices 180 may be used to input a wakeup signal to the resume module 178, such that the resume module 178 may be activated.

In certain embodiments, as shown in FIG. 1, the system 100 may further be connected to a network, such as a local area network (LAN) 190. An administrator of the system 100 may remotely control the processing device 170 from a remote computing device (not shown) by sending a wakeup signal or a power on signal to the resume module 178 through the LAN, such that the resume module 178 may be activated to perform the wakeup process or the power-on process.

In another aspect, the present disclosure is related to a method of low cost power control for embedded systems.

Figure 2:
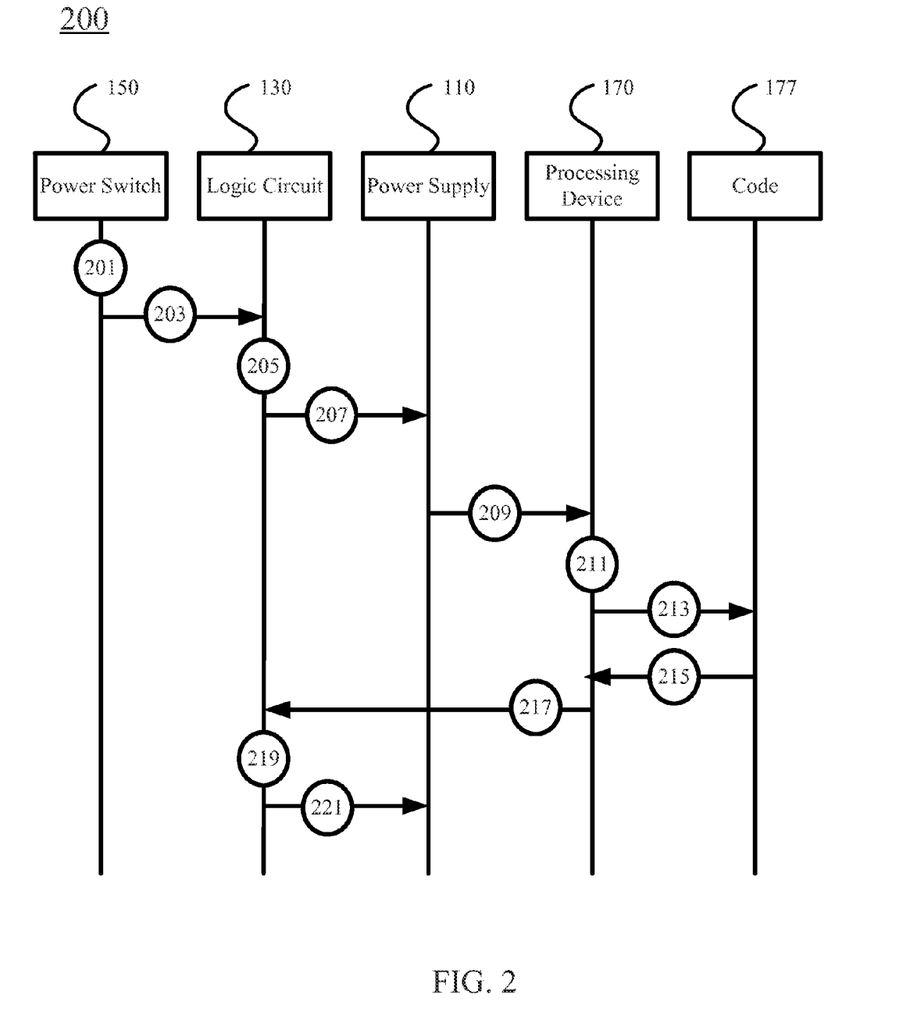
FIG. 2 schematically depicts a method of performing power control according to certain embodiments of the present disclosure, where the processing device switches from a power off state to a power on state.

FIG. 2 schematically depicts a method of performing power control according to certain embodiments of the present disclosure, where the processing device 170 is switched from a default state (the power off state) to a power on state. It should be noted that the method 200 as shown in FIG. 2 may be implemented in the system 100 as shown in FIG. 1.

At the default state or the power off state, the power supply 110 is connected to a power source such that the power supply 110 is ready to provide power. The power supply 110 receives power input from the power source through the AC input 111, and outputs power to the standby power line 115. The power from the standby power line 115 turns on the resume module 178. However, the power supply 110 at this situation does not provide power to the power supply line 113, and the at least one processor 175 of the processing device 170 is not turned on. At the stage, the signals at the first I/O interface 171 and the third I/O interface 173 may be low input values (i.e., logical "0" signals), and the signals at the second I/O interface 172 and the fourth I/O interface 174 may be in a tri-state. In certain embodiments, all of the four GPIO interfaces 171-174 are in a low state or in a tri-state.

At operation 201, a user may press the power switch 150 such that the power switch 150 is electrically connecting the standby power line 115 to the first I/O interface 171 and the first input terminal 131 for a short time. At operation 203, the connection of the power switch 150 drives a high input value to the first input terminal 131 of the logic circuit 130. It should be noted that the connection of the power switch 150 also drives the high input value to the first I/O interface 171 of the processing device 170. At this time, however, the processing device 170 is in the power off state, and is thus not responsive to the high input value received from the first I/O interface 171.

Upon receiving the high input value via the first input terminal 131, at operation 205, the logic circuit 130 generates a low output value. At operation 207, the logic circuit 130 drives the low output value to the power supply 110 via the first output terminal 134.

At operation 209, after receiving the low input value outputted from the first output terminal 134, the power supply 110 starts providing power to the power supply line 113. Since the power supply line 113 is connected to the processing device 170, the processing device 170 will receive the power provided by the power supply line 113. At operation 211, the power provided by the power supply line 113 is connected to the at least one processor 175 of the processing device 170, and the processor 175 is powered up. At operation 213, the processing device 170 starts executing the code 177 stored in the storage 176, and the processing device 170 changes from the power off state to the power on state.

At operation 215, when the processing device 170 is in the power on state, the executed code 177 controls the processing device 170 to output a high input value to the second I/O interface 172. At operation 217, the processing device 170, under the control of the executed code 177, outputs the high input value to the second I/O interface 172. Since the second I/O interface 172 is electrically connected to the second input terminal 132 of the logic circuit 130, the logic circuit 130 will receive the high input value via the second input terminal 132.

At operation 219, the logic circuit 130 receives the high input value from the second input terminal 132, and in response, the logic circuit 130 generates the low output value. At operation 221, the logic circuit 130 outputs the low output value to the power supply 110, such that the power supply 110 continues supplying power to both the power supply line 113 and the standby line 115.

It should be noted that the operations 217-221 will be maintained during the execution of the code 177. In other words, the code 177, when executed, will keep outputting the high input value to the second I/O interface 172, such that the logic circuit 130 keeps outputting the low output value to the power supply 110 to ensure that the processing device 170 keeps receiving power from the power supply 110 through the power supply line 113.

Figure 3:
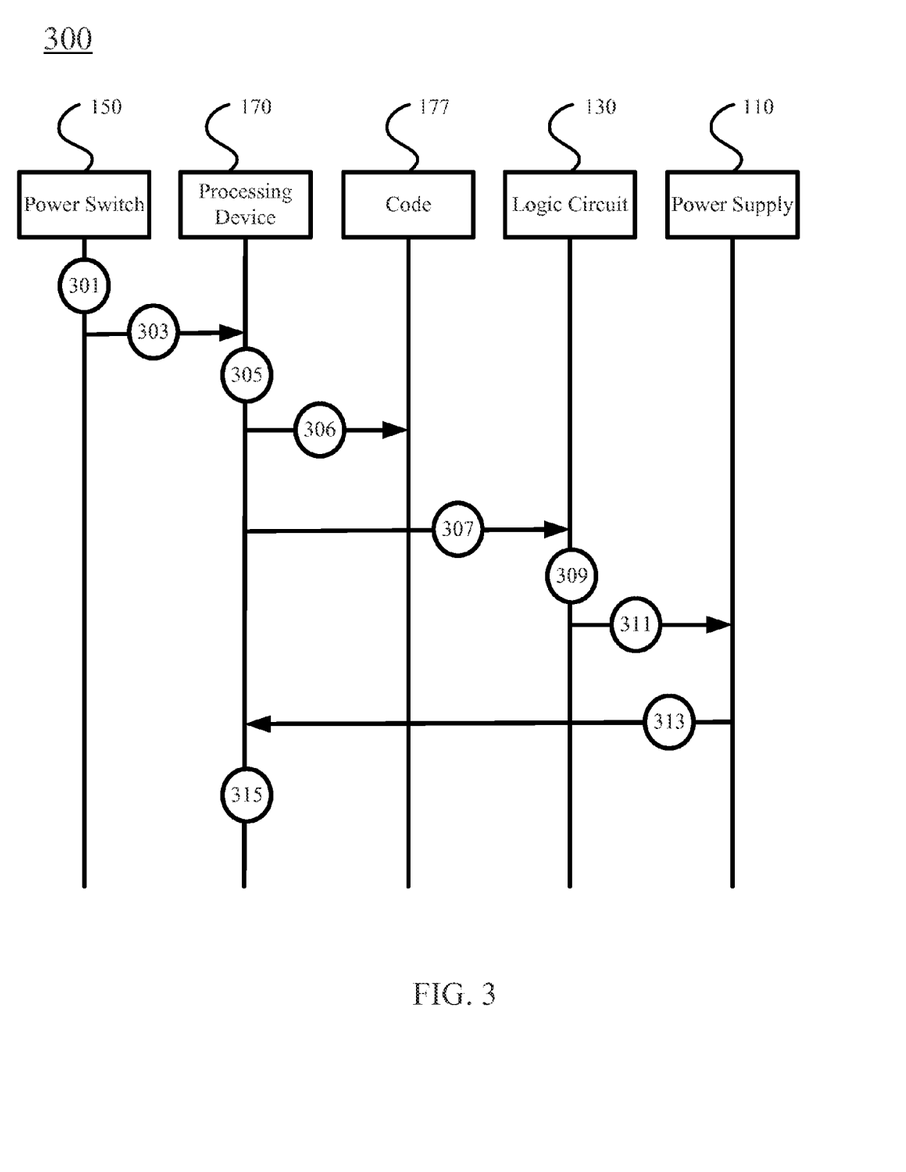
FIG. 3 schematically depicts a method of performing power control according to certain embodiments of the present disclosure, where the processing device switches from a power on state to a power off state through a soft off process.

FIG. 3 schematically depicts a method of performing power control according to certain embodiments of the present disclosure, where the processing device 170 switches from a power on state to a power off state (the default state) through a soft off process. It should be noted that the method 300 as shown in FIG. 3 may be implemented in the system 100 as shown in FIG. 1.

When the processing device 170 is in the power on state, at operation 301, a user may, at any time, press the power switch 150 for less than a predetermined period of time, such that the power switch 150 is electrically connecting the standby power line 115 to the first I/O interface 171 and the first input terminal 131. In certain embodiments, the predetermined period may be about 5 seconds. The pressing action to the power switch 150 for less than the predetermined period of time indicates that the user intends to perform a soft off process.

At operation 303, the connection of the power switch 150 sends a high value to the first I/O interface 171 for less than the predetermined time period of time.

At operation 305, the processing device 170 in the power on state receives the high value from the first I/O interface 171 for less than or equal to the predetermined period of time. In response to the received high value from the first I/O interface 171 for less than the predetermined period of time, at operation 306, the processing device 170 is configured to shut down the code 177 executed at the at least one processor safely. In certain embodiments, by shutting down the code 177 safely, the processing device 170 will copy necessary information in the processor 175 running the code 177 to the storage 176, and then stop the execution of the code 177. After shutting down the code safely, the processing device 170 then powers off the at least one processor 175.

At operation 307, after the code 177 stops execution, the processing device 170 sends the low input value to the second I/O interface 172. Since the second I/O interface 172 is electrically connected to the second input terminal 132 of the logic circuit 130, the low input value will be sent to the second input terminal 132 of the logic circuit 130. In certain embodiments, the executed code 177 may notify the processing device 170 at the end of the shutting down process, such that the processing device 170 may send the low input value to the second input terminal 172.

Upon receiving the low input value via the second input terminal 132, at operation 309, the logic circuit 130 generates the high output value. At operation 311, the logic circuit 130 drives the high output value to the power supply 110 via the first output terminal 134.

At operation 313, after receiving the high output value outputted from the first output terminal 134, the power supply 110 stops providing power to the power supply line 113. Since the power supply line 113 is connected to the processing device 170, the processing device 170 will stop receiving the power provided by the power supply line 113. It should be noted that the power supply 110 continues supplying power to the processing device 170 through the standby power line 115. Accordingly, at operation 315, the processor 175 of the processing device 170 is shut down due to the power off of the power supply line 113, and the processing device 170 is switched from the power on state to the power off state.

Figure 4:
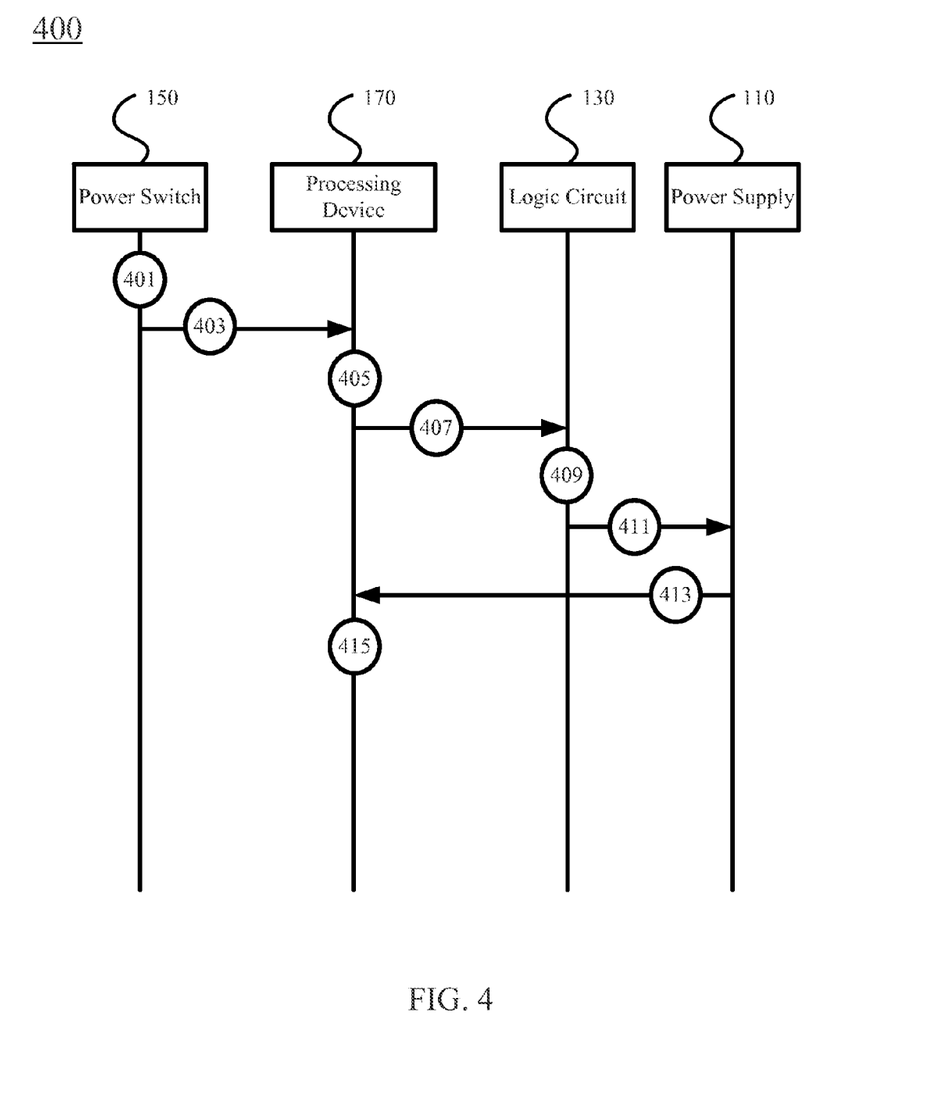
FIG. 4 schematically depicts a method of performing power control according to certain embodiments of the present disclosure, where the processing device switches from a power on state to a power off state through a hard off process.

FIG. 4 schematically depicts a method of power control according to certain embodiments of the present disclosure, where the processing device 170 is switched from a power on state to a power off state (the default state) through a hard off process. It should be noted that the method 400 as shown in FIG. 4 may be implemented in the system 100 as shown in FIG. 1.

When the processing device 170 is in the power on state, at operation 401, a user may, at any time, press the power switch 150 for greater than or equal to a predetermined period of time, such that the power switch 150 is electrically connecting the standby power line 115 to the first I/O interface 171 and the first input terminal 131. In certain embodiments, the predetermined period may be about 5 seconds. The pressing action to the power switch 150 for greater than or equal to the predetermined period of time indicates that the user intends to perform a hard off process.

At operation 403, the connection of the power switch 150 sends a high value to the first I/O interface 171 for greater than or equal to the predetermined time period of time.

At operation 405, the processing device 170 in the power on state receives the high value from the first I/O interface 171 for greater than or equal to the predetermined period of time. In response to the received high value from the first I/O interface 171 for greater than or equal to the predetermined period of time, at operation 407, the processing device 170 sends the low input value to the second I/O interface 172. Since the second I/O interface 172 is electrically connected to the second input terminal 132 of the logic circuit 130, the low input value will be sent to the second input terminal 132 of the logic circuit 130.

Upon receiving the low input value via the second input terminal 132, at operation 409, the logic circuit 130 generates a high output value. At operation 411, the logic circuit 130 drives the high output value to the power supply 110 via the first output terminal 134.

At operation 413, after receiving the high output value outputted from the first output terminal 134, the power supply 110 in the power on state stops providing power to the power supply line 113. Since the power supply 113 is connected to the processing device 170, the processing device 170 will stop receiving power provided by the power supply line 113. It should be noted that the power supply 110 continues supplying power to the processing device 170 through the standby power line 115. Accordingly, at operation 415, the processor 175 of the processing device 170 is shut down due to the power off of the power supply line 113, and the processing device 170 is switched from the power on state to the power off state.

It should be noted that the difference between the hard off process, as shown in FIG. 4, and the soft off process, as shown in FIG. 3, exists in that the soft off process include the operation 306 in which the processing device 170 performs shutting down of the executed code 177, and the hard off process does not have such operation. In other words, in the hard off process as shown in FIG. 4, the processing device 170 does not shut down the executed code 177 before switching to the power off state. Thus, in certain embodiments, the processing device 170 may not copy necessary information of the executed code 177 in the processor 175 to the storage 176 since no shutting down process is performed.

Figure 5:
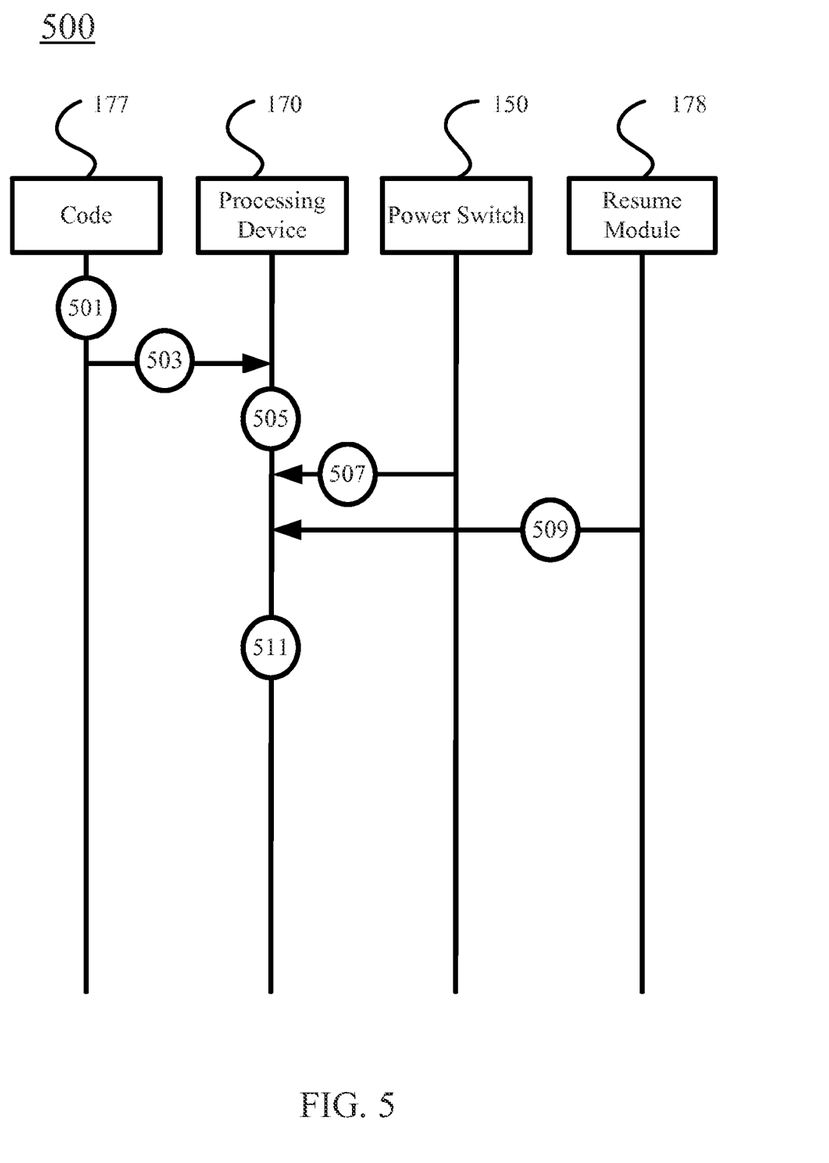
FIG. 5 schematically depicts a method of performing power control according to certain embodiments of the present disclosure, where the processing device switches from a power on state to a suspend state and switches from the suspend state back to the power on state.

FIG. 5 schematically depicts a method of power control according to certain embodiments of the present disclosure, where processing device 170 is switched from a power on state to a suspend state and switched from the suspend state back to the power on state. It should be noted that the method 500 as shown in FIG. 5 may be implemented in the system 100 as shown in FIG. 1.

When the processing device 170 is in the power on state, a suspend event 185 may occur. For example, at operation 501, the executed code 177 may receive an instruction from the user to suspend the processing device 170. In certain embodiments, the suspend event may occur at any time, and may occur due to a local suspend instruction received at the executed code 177, the hardware components of the processing device 170, the peripheral device 180, a remote suspend instruction from the LAN 190, or any other components within or outside the system 100.

Upon receiving the suspend event, at operation 503, the code 177 controls the processing device 170 to perform a suspend operation. For example, the code 177 may send a suspend signal to the processing device 170 to start the suspend operation. At operation 505, the processing device 170 in the power on state receives the suspend signal from the code 177, and switch from the power on state to a suspend state (i.e., a low power mode). In certain embodiments, the processing device 170 in the suspend state runs the processor 175 at a low frequency. When the processing device 170 is in the suspend state, the processing device 170 is further configured to monitor the status of the first I/O interface 171 and the fourth I/O interface 174.

At operation 507, when the processing device 170 is in the suspend state, and a user presses the power switch 150, the power switch 150 electrically connects the standby power line 115 to the first I/O interface 171, such that the processing device 170 receives a high input value from the first I/O interface 171. Such high input value functions as a wakeup signal. Alternatively, at operation 509, when the resume module 178 receives a wakeup signal, the resume module 178 sends a high input value to the third I/O interface 173. Since the third I/O interface 173 is electrically connected to the fourth I/O interface 174, the processing device 170 receives the high input value from the fourth I/O interface 174. Such high input value functions as a wakeup signal. In certain embodiments, the wakeup signal received by the resume module 178 may be from the peripheral device 180 or the LAN 190.

Upon receiving the wakeup signal, at operation 511, the processing device 170 is configured to power up. For example, the processing device 170 may run the processor 175 at a normal working frequency higher than the frequency used in the suspend state, such that the processing device 170 returns to the power on state from the suspend state.

In a further aspect, the present disclosure is related to a non-transitory computer readable medium storing computer executable code. The code, when executed at one or more processer 175 of a processing device 170, may perform the method as described above. In certain embodiments, the non-transitory computer readable medium may include, but not limited to, the storage device 176 as described above, or any other storage media of the processing device 170.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system for power control, comprising:
    a power supply, having a power supply line and a standby power line;
    a logic circuit having a first input terminal, a second input terminal, a third input terminal, and a first output terminal electrically connected to the power supply;
    a processing device electrically connected to the standby power line and the power supply line, the processing device comprising:
        at least one processor;
        a storage storing a computer executable code executable by the at least one processor;
        a first input/output (I/O) interface electrically connected to the first input terminal;
        a second I/O interface electrically connected to the second input terminal;
        a third I/O interface electrically connected to the third input terminal; and
        a fourth I/O interface electrically connected to the third I/O interface; and
    a power switch configured to switchably electrically connect the standby power line to the first I/O interface and the first input terminal or to electrically disconnect the standby power line from the first I/O interface and the first input terminal, wherein:
        when the power switch electrically connects the standby power line to the first I/O interface and the first input terminal, the first I/O interface and the first input terminal respectively receives a high input value; and
        when the power switch electrically disconnects the standby power line from the first I/O interface and the first input terminal, the first I/O interface and the first input terminal respectively receives a low input value;
    wherein the logic circuit is configured to:
        in response to receiving the high input value from at least one of the first, the second and the third input terminal, drive a low output value to the power supply via the first output terminal; and
        in response to receiving the low input value from each of the first, the second and the third input terminal, drive a high output value to the power supply via the first output terminal;
    wherein the power supply is configured to:
        provide power to the standby power line;
        in response to receiving the low output value from the logic circuit, provide power to the power supply line; and
        in response to receiving the high output value from the logic circuit, cut off power to the power supply line;
    wherein the processing device is configured to:
        in response to receiving power from the power supply line, switch to a power on state, and execute the computer executable code at the processor; and
    wherein the computer executable code, when executed at the processor, is configured to:
        drive a high value as the high input value to the second I/O interface when the processing device is in the power on state; and
        in response to receiving the high input value from the first I/O interface, drive a low value as the low input value to the second I/O interface, and control the processing device to switch to a power off state.

2. The system of claim 1, wherein the processing device further comprises a resume module electrically connected to the standby power line and the fourth I/O interface, and wherein the processing device is further configured to:
    in response to receiving a suspend signal from the resume module, switch the processing device to a suspend state, and monitor status of the first I/O interface and the fourth I/O interface.

3. The system of claim 2, wherein when the processing device in the suspend state receives the high input value from the first I/O interface, the processing device is configured to switch to the power on state.

4. The system of claim 2, wherein the resume module is configured to:
    receive a wakeup signal from a peripheral device or a local area network (LAN); and
    in response to receiving the wakeup signal, drive the high input value to the third I/O interface.

5. The system of claim 4, wherein when the processing device in the suspend state receives the high input value from the fourth I/O interface, the processing device is configured to switch to the power on state.

6. The system of claim 1, wherein when the processing device in the power on state receives the high input value from the first I/O interface for less than a first predetermined time, the processing device is configured to:
    safely shut down the code;
    drive the low input value to the second I/O interface; and
    switch to the power off state.

7. The system of claim 6, wherein when the processing device in the power on state receives the high input value from the first I/O interface for greater than or equal to the first predetermined time, the processing device is configured to:
    drive the low input value to the second I/O interface; and
    switch to the power off state.

8. The system of claim 6, wherein the first predetermined time is about 5 seconds.

9. The system of claim 1, wherein the logic circuit comprises:
    a first OR gate, having two input terminals respectively electrically connected to the first and second input terminals, and an output terminal;
    a second OR gate, having two input terminals respectively electrically connected to the third input terminal and the output terminal of the first OR gate, and an output terminal; and
    a NOT gate, having an input terminal connected to the output terminal of the second OR gate, and an output terminal connected to the first output terminal.

10. The system of claim 1, wherein each of the first, second, third and fourth I/O interfaces is a general-purpose input/output (GPIO) interface.

11. The system of claim 10, wherein the first and fourth I/O interfaces are configured to be input GPIO interfaces, and the second and third I/O interfaces are configured to be output GPIO interfaces.

12. The system of claim 1, wherein the storage is a flash memory.

13. A method of performing power control in a system, comprising:
providing, by a power supply of the system, power to a standby power line, wherein the standby power line is electrically connected to a processing device and a power switch of the system, wherein the processing device has at least one processor, a storage storing a computer executable code, a first I/O interface, a second I/O interface, a third I/O interface, and a fourth I/O interface, wherein the power switch is configured to connect the standby power line to the first I/O interface and a first input terminal of a logic circuit or to electrically disconnect the standby power line from the first I/O interface and the first input terminal, wherein the logic circuit has the first input terminal, a second input terminal, a third input terminal, and a first output terminal electrically connected to the power supply, and wherein the logic circuit is configured to:
in response to receiving the high input value from at least one of the first, the second and the third input terminal, drive a low output value to the power supply via the first output terminal; and
in response to receiving the low input value from each of the first, the second and the third input terminal, drive a high output value to the power supply via the first output terminal;
in response to receiving the low output value from the logic circuit, providing, by the power supply, power to a power supply line, wherein the power supply line is electrically connected to the processing device;
in response to receiving power from the power supply line, switching, by the processing device, to a power on state, and executing the computer executable code at the processor;
when the processing device is in the power on state, driving, by the code executed at the processor, the high input value to the second I/O interface;
in response to receiving the high output value from the logic circuit, cutting off, by the power supply, power to the power supply line; and
in response to receiving a high value from the first I/O interface, driving, by the code executed at the processor, the low input value to the second I/O interface, and controlling the processing device to switch to a power off state.

14. The method of claim 13, further comprising:
in response to receiving a suspend signal from a resume module of the processing device, switching, by the processing device, to a suspend state, and monitoring status of the first I/O interface and the fourth I/O interface, wherein the resume module is electrically connected to the standby power and the fourth I/O interface.

15. The method of claim 14, further comprising:
switching, by the processing device, to the power on state when the processing device in the suspend state receives the high input value from the first I/O interface.

16. The method of claim 14, further comprising:
receiving, at the resume module, a wakeup signal from a peripheral device or a local area network (LAN);
in response to receiving the wakeup signal, driving, by the resume module, the high input value to the third input terminal of the logic circuit; and
switching, by the processing device, to the power on state when the processing device in the suspend state receives the high input value from the fourth I/O interface.

17. The method of claim 13, wherein when the processing device in the power on state receives the high input value from the first I/O interface for less than a first predetermined time, the processing device is configured to:
safely shut down the code;
drive the low input value to the second I/O interface; and
switch to the power off state.

18. The method of claim 17, wherein when the processing device in the power on state receives the high input value from the first I/O interface for greater than or equal to the first predetermined time, the processing device is configured to:
drive the low input value to the second I/O interface; and
switch to the power off state,
wherein the first predetermined time is about 5 seconds.

19. The method of claim 13, wherein the logic circuit comprises:
a first OR gate, having two input terminals respectively electrically connected to the first and second input terminals, and an output terminal;
a second OR gate, having two input terminals respectively electrically connected to the third input terminal and the output terminal of the first OR gate, and an output terminal; and
a NOT gate, having an input terminal connected to the output terminal of the second OR gate, and an output terminal connected to the first output terminal.

20. The method of claim 13, wherein each of the first, second, third and fourth I/O interfaces is a general-purpose input/output (GPIO) interface, the first and fourth I/O interfaces are configured to be input GPIO interfaces, and the second and third I/O interfaces are configured to be output GPIO interfaces.

21. A non-transitory computer readable medium storing computer executable code, wherein the code, when executed at a processor of a processing device of a system, is configured to:
drive a high value as a high input value to a second input/output (I/O) interface of the processing device when the processing device is in a power on state, wherein the processing device is electrically connected to a standby power line and a power supply line of a power supply, wherein the processing device comprises:
the processor;
a first I/O interface electrically connected to a first input terminal of a logic circuit of the system, wherein the logic circuit has the first input terminal, a second input terminal, a third input terminal, and a first output terminal electrically connected to the power supply;
a second I/O interface electrically connected to the second input terminal;
a third I/O interface electrically connected to the third input terminal; and
a fourth I/O interface electrically connected to the third I/O interface; and
in response to receiving the high input value from the first I/O interface, drive a low value as a low input value to the second I/O interface, and control the processing device to switch to a power off state,
wherein a power switch of the system is configured to switchably electrically connect the standby power line to the first I/O interface and the first input terminal or to electrically disconnect the standby power line from the first I/O interface and the first input terminal, wherein:
  when the power switch electrically connects the standby power line to the first I/O interface and the first input terminal, the first I/O interface and the first input terminal respectively receives the high input value; and
  when the power switch electrically disconnects the standby power line from the first I/O interface and the first input terminal, the first I/O interface and the first input terminal respectively receives the low input value;
wherein the logic circuit is configured to:
  in response to receiving the high input value from at least one of the first, the second and the third input terminal, drive a low output value to the power supply via the first output terminal; and
  in response to receiving the low input value from each of the first, the second and the third input terminal, drive a high output value to the power supply via the first output terminal;
wherein the power supply is configured to:
  provide power to the standby power line;
  in response to receiving the low output value from the logic circuit, provide power to the power supply line; and
  in response to receiving the high output value from the logic circuit, cut off power to the power supply line; and
wherein the processing device is configured to:
  in response to receiving power from the power supply line, switch to the power on state, and execute the computer executable code at the processor.

22. The non-transitory computer readable medium of claim 21, wherein the processing device further comprises a resume module electrically connected to the standby power line and the fourth I/O interface, and wherein the processing device is further configured to:
  in response to receiving a suspend signal from the resume module, switch the processing device to a suspend state, and monitor status of the first I/O interface and the fourth I/O interface.

23. The non-transitory computer readable medium of claim 22, wherein when the processing device in the suspend state receives the high input value from the first I/O interface, the processing device is configured to switch to the power on state.

24. The non-transitory computer readable medium of claim 22, wherein the resume module is configured to:
  receive a wakeup signal from a peripheral device or a local area network (LAN); and
  in response to receiving the wakeup signal, drive the high input value to the third I/O interface;
  wherein when the processing device in the suspend state receives the high input value from the fourth I/O interface, the processing device is configured to switch to the power on state.

25. The non-transitory computer readable medium of claim 21, wherein when the processing device in the power on state receives the high input value from the first I/O interface for less than a first predetermined time, the processing device is configured to:
  safely shut down the code;
  drive the low input value to the second I/O interface; and
  switch the processing device to the power off state.

26. The non-transitory computer readable medium of claim 21, wherein when the processing device in the power on state receives the high input value from the first I/O interface for greater than or equal to the first predetermined time, the processing device is configured to:
  drive the low input value to the second I/O interface; and
  switch the processing device to the power off state,
  wherein the first predetermined time is about 5 seconds.

27. The non-transitory computer readable medium of claim 21, wherein the logic circuit comprises:
  a first OR gate, having two input terminals respectively electrically connected to the first and second input terminals, and an output terminal;
  a second OR gate, having two input terminals respectively electrically connected to the third input terminal and the output terminal of the first OR gate, and an output terminal; and
  a NOT gate, having an input terminal connected to the output terminal of the second OR gate, and an output terminal connected to the first output terminal.

28. The non-transitory computer readable medium of claim 21, wherein each of the first, second, third and fourth I/O interfaces is a general-purpose input/output (GPIO) interface, the first and fourth I/O interfaces are configured to be input GPIO interfaces, and the second and third I/O interfaces are configured to be output GPIO interfaces.

\* \* \* \* \*